(12) United States Patent
Ahn et al.

(10) Patent No.: US 11,709,386 B2
(45) Date of Patent: Jul. 25, 2023

(54) LIQUID CRYSTAL DISPLAY DEVICE

(71) Applicant: NEW OPTICS, LTD., Yangju-si (KR)

(72) Inventors: Jong Ki Ahn, Seoul (KR); Dong Kyu Kim, Paju-si (KR)

(73) Assignee: NEW OPTICS, LTD., Yangju-si (KR)

( * ) Notice: Subject to any disclaimer, the term of this patent is extended or adjusted under 35 U.S.C. 154(b) by 0 days.

(21) Appl. No.: 17/374,376

(22) Filed: Jul. 13, 2021

(65) Prior Publication Data

US 2021/0341783 A1 Nov. 4, 2021

Related U.S. Application Data

(63) Continuation-in-part of application No. 17/032,695, filed on Sep. 25, 2020, now abandoned.

(30) Foreign Application Priority Data

Dec. 13, 2019 (KR) ........................ 10-2019-0167066
Dec. 11, 2020 (KR) ........................ 10-2020-0173834

(51) Int. Cl.
*G02F 1/1333* (2006.01)

(52) U.S. Cl.
CPC .. *G02F 1/133385* (2013.01); *G02F 1/133314* (2021.01); *G02F 1/133331* (2021.01)

(58) Field of Classification Search
CPC ......... G02F 1/133308; G02F 1/133385; G02F 1/133608; G02F 2201/36
See application file for complete search history.

(56) References Cited

U.S. PATENT DOCUMENTS

| 2008/0089028 A1* | 4/2008 | Kim .................. G02F 1/133608 |
| | | 165/104.33 |
| 2009/0096957 A1 | 4/2009 | Hiyama et al. |
| 2009/0126914 A1* | 5/2009 | Dunn .................. G02F 1/13306 |
| | | 361/695 |
| 2009/0225533 A1 | 9/2009 | Yamagishi et al. |
| 2010/0027296 A1 | 2/2010 | Hamada |
| 2011/0019363 A1 | 1/2011 | Vahlsing et al. |
| 2011/0037937 A1 | 2/2011 | Yang et al. |
| 2011/0164402 A1 | 7/2011 | Kang et al. |

(Continued)

FOREIGN PATENT DOCUMENTS

| JP | 2018-049233 A | 3/2018 |
| KR | 10-2010-0077618 A | 7/2010 |

(Continued)

*Primary Examiner* — Hoan C Nguyen
(74) *Attorney, Agent, or Firm* — NKL Law; Jae Youn Kim (57) ABSTRACT

Disclosed is a liquid crystal display device including: a liquid crystal display panel for displaying an image; a backlight unit for irradiating light toward a rear surface of the liquid crystal display panel; a cover bottom formed therein with a space in which the liquid crystal display panel and the backlight unit are installed; and a glass attached to a front surface of the liquid crystal display panel to protect the liquid crystal display panel, wherein the liquid crystal display panel and the backlight unit are spaced apart from each other so that air moves through a space between the liquid crystal display panel and the backlight unit. Accordingly, a sealed space is formed inside the liquid crystal display device, and the air inside the sealed space is circulated, so that thermal equilibrium is induced inside the sealed space.

4 Claims, 6 Drawing Sheets

(56) References Cited

U.S. PATENT DOCUMENTS

| | | | |
|---|---|---|---|
| 2012/0170284 A1 | | 7/2012 | Shedletsky |
| 2014/0111940 A1 | * | 4/2014 | Dunn |
| 2017/0172016 A1 | * | 6/2017 | Kang .................. G09F 9/35 |
| 2017/0269423 A1 | | 9/2017 | Zhang et al. |
| 2018/0088368 A1 | | 3/2018 | Notoshi et al. |
| 2018/0180798 A1 | | 6/2018 | Kim |

FOREIGN PATENT DOCUMENTS

| | | | |
|---|---|---|---|
| KR | 10-2011-0016292 A | 2/2011 | |
| KR | 10-2011-0016294 A | 2/2011 | |
| KR | 10-2011-0080896 A | 7/2011 | |
| KR | 10-1598056 B1 | 2/2016 | |
| KR | 10-1763308 B1 | 8/2017 | |
| KR | 10-1987812 B1 | 6/2019 | |
| WO | WO-9830134 A1 * | 7/1998 | .......... A47F 3/0413 |
| WO | 2009-065125 A2 | 5/2009 | |

\* cited by examiner

| Time (h:m) | Prior art | | | | | | | This invention | | | | | |
|---|---|---|---|---|---|---|---|---|---|---|---|---|---|
| | Temp. (°C) | Out glass surface | | | inner panel surface | | | Out Glass surface | | | Inner Panel surface | | |
| | | upper | middle | lower | upper | middle | lower | upper | middle | lower | upper | middle | lower |
| 0:05 | 29.6 | 23.6 | 24.3 | 22.8 | 24.2 | 23.3 | 20.6 | 20.1 | 21.7 | 18.5 | 18.6 | 19.2 | 18.1 |
| 0:30 | 34.5 | 40.6 | 38.1 | 37.8 | 42.2 | 37.9 | 39.2 | 58.5 | 65.6 | 43.4 | 57.6 | 63.0 | 38.6 |
| 1:00 | 36.5 | 71.2 | 71.8 | 52.8 | 72.5 | 70.6 | 54.6 | 66.1 | 73.4 | 45.8 | 66.4 | 71.3 | 40.7 |
| 1:30 | 38.7 | 84.7 | 86.6 | 60.7 | 87.2 | 86.1 | 62.7 | 70.5 | 78.3 | 48.3 | 71.2 | 75.9 | 43.0 |
| 2:00 | 40.3 | 88.0 | 88.5 | 63.2 | 91.8 | 89.4 | 65.9 | 73.6 | 81.5 | 50.0 | 74.3 | 79.0 | 44.9 |
| 2:30 | 40.4 | 94.7 | 96.8 | 67.9 | 97.7 | 96.7 | 70.7 | 74.9 | 83.2 | 51.1 | 75.9 | 80.4 | 45.9 |
| 3:00 | 42.1 | | | | yellowing | | | 76.6 | 84.6 | 52.0 | 77.2 | 81.6 | 47.1 |
| 3:30 | 43.2 | | | | | | | 77.9 | 86.2 | 53.2 | 78.4 | 83.2 | 48.0 |
| 4:00 | 43.5 | | | | | | | 78.9 | 88.2 | 54.5 | 79.5 | 86.3 | 50.9 |
| 4:30 | 44.0 | | | | blackening | | | 79.2 | 88.6 | 55.2 | 79.5 | 89.2 | 51.0 |
| 5:00 | 45.0 | | | | | | | 79.2 | 88.9 | 55.7 | 79.5 | 86.6 | 51.6 |
| 5:30 | | | | | | | | | 90.4 | 55.4 | 78.8 | 86.6 | 52.6 |
| 6:30 | | | | | | | | | 94.8 | 58.3 | 79.9 | 90.2 | 55.5 |
| 7:00 | | | | | | | | | 97.7 | 61.1 | 83.0 | 92.9 | 58.3 |
| | | | | | | | | | blackening | | | | |

FIG. 6

LIQUID CRYSTAL DISPLAY DEVICE

CROSS-REFERENCE TO RELATED APPLICATIONS

This application is a continuation-in-part of U.S. application Ser. No. 17/032,695, filed Sep. 25, 2020, which claims priority to KR10-2019-0167066, filed Dec. 13, 2019, and this application also claims priority to KR10-2020-0173834, filed Dec. 11, 2020, the entire disclosures of which are incorporated herein by references.

BACKGROUND OF THE INVENTION

1. Field of the Invention

The present invention relates to a liquid crystal display device, and more particularly, to a liquid crystal display device having a structure for cooling a glass in the liquid crystal display device to which the glass is applied.

2. Description of the Related Art

Liquid crystal display devices are devices for displaying image data by adjusting an amount of passing light by using a characteristic that an arrangement state of liquid crystal molecules varies according to an applied voltage.

Such liquid crystal display devices may be classified into a liquid crystal display device adopting a simple matrix scheme and a liquid crystal display device adopting an active matrix scheme according to a liquid crystal display matrix.

The simple matrix scheme is configured such that active elements such as transistors are attached to a glass substrate. Although the performance of the simple matrix scheme is excellent, a process may be complicated, and it may be difficult to increase a size.

The active matrix scheme has a structure in which one transistor for controlling a voltage is connected to one liquid crystal dot, and may have a strong contrast so as not to cause smears, so that the active matrix scheme may be used for a color type.

Such a liquid crystal display device adopting the active matrix scheme has been widely used in flat panel TVs, portable computers, monitors, and the like as the performance of the liquid crystal display device adopting the active matrix scheme rapidly develops.

For example, the applicant of the present invention has disclosed the technique of the liquid crystal display device in various patent documents such as the following patent documents 1 to 3, which have been filed and registered now.

Meanwhile, a glass for protecting a liquid crystal display panel may be applied to the liquid crystal display device.

In general, the glass may be spaced apart from the liquid crystal display panel by a predetermined interval.

However, in recent years, in order to prevent deterioration of image quality due to separation between the liquid crystal display panel and the glass, a technique for directly bonding the glass and the liquid crystal display panel has been developed.

Such a technique is referred to as 'direct bonding' or 'optical bonding' (hereinafter abbreviated as "direct bonding").

In a case of using a display module to which the direct bonding technique is applied, when the display module is used in an environment exposed to direct sunlight or other high-temperature heat sources for a predetermined time, high-temperature radiant heat may be generated in the glass attached to a front surface of the liquid crystal display panel. Therefore, the high-temperature radiant heat may be transferred to the liquid crystal display panel attached to the glass, so that thermal deformation may occur in the liquid crystal display panel.

Accordingly, the damage to the liquid crystal display panel that is thermally deformed may be shown in the form of a smear or a bruise called 'mum' at a lower end of the display module, and yellow deformation may be mainly and distinctively recognized.

Such damage to the liquid crystal display panel may be particularly severe at the lower end due to the influence of gravity acting on the liquid crystal display panel and the glass, and may also be shown on left and right sides.

Therefore, when a liquid crystal display device adopting the direct bonding technique is used, there has been a demand for developing a technique capable of preventing the thermal deformation of the liquid crystal display panel in a high-temperature environment.

DOCUMENTS OF RELATED ART

Patent Documents (Patent document 1) Korean Patent Registration No. 10-1598056 (published on Feb. 26, 2016)
(Patent document 2) Korean Patent Registration No. 10-1763308 (published on Aug. 4, 2017)
(Patent document 3) Korean Patent Registration No. 10-1987812 (published on Jun. 12, 2019)

SUMMARY OF THE INVENTION

To solve the problems described above, one object of the present invention is to provide a liquid crystal display device capable of cooling a liquid crystal display panel and a glass by allowing air to move through a space between a backlight unit and the liquid crystal display panel that has a front surface to which the glass is attached by a direct bonding scheme.

Another object of the present invention is to provide a liquid crystal display device capable of preventing thermal deformation due to high-temperature radiant heat by cooling the liquid crystal display panel to which the glass is attached by the direct bonding scheme.

Still another object of the present invention is to provide a liquid crystal display device capable of effectively cooling the liquid crystal display panel even under a high-temperature condition through a scaled space formed inside the liquid crystal display device and through induction of thermal equilibrium achieved by circulating the air inside the sealed space.

To achieve the objects described above, according to the present invention, there is provided a liquid crystal display device including: a liquid crystal display panel for displaying an image; a backlight unit for irradiating light toward a rear surface of the liquid crystal display panel; a cover bottom formed therein with a space in which the liquid crystal display panel and the backlight unit are installed; and a glass attached to a front surface of the liquid crystal display panel to protect the liquid crystal display panel, wherein the liquid crystal display panel and the backlight unit are spaced apart from each other so that air moves through a space between the liquid crystal display panel and the backlight unit.

As described above, according to the liquid crystal display device of the present invention, the sealed space is formed inside the liquid crystal display device, and the air inside the sealed space is circulated, so that the thermal equilibrium can be induced inside the sealed space.

Therefore, according to the present invention, when compared with a scheme of directly introducing external air into a liquid crystal display device by using a fan and an air filter, the same cooling effect can be obtained while simplifying a structure.

In other words, according to the present invention, the liquid crystal display panel can be effectively cooled even when the external air has a higher temperature than internal air, and a completely sealed structure in which the liquid crystal display panel and the backlight unit are arranged inside the liquid crystal display device is provided, so that a disadvantage that replacement and cleaning of a filter have to be performed can be sufficiently compensated for, and the present invention can be applied to a product even when a use environment is under unfavorable conditions, such as a high-temperature environment and a state where much dust or foreign substances exist.

In addition, according to the present invention, the thermal equilibrium is induced by the circulation of the air inside the sealed space, so that a rear cover can be directly cooled by introducing the external air to an outside of the rear cover spaced apart from the backlight unit by using an external fan or the like, and thus an indirect heat dissipation effect can also be obtained.

DETAILED DESCRIPTION OF THE INVENTION

Hereinafter, a liquid crystal display device according to an exemplary embodiment of the present invention will be described in detail with reference to the accompanying drawings.

First, prior to describing a configuration of the liquid crystal display device according to the exemplary embodiment of the present invention, configurations of liquid crystal display devices according to the related art will be schematically described with reference to FIGS. 1 and 2.

Hereinafter, a direction in which a glass is installed based on a liquid crystal display panel is referred to as a 'front side', and an opposite direction thereof is referred to as a 'rear side'.

In addition, terms indicating directions such as 'left', 'right, 'upward', and 'downward' are defined as indicating respective directions based on the above-described front and rear sides.

Figure 1:
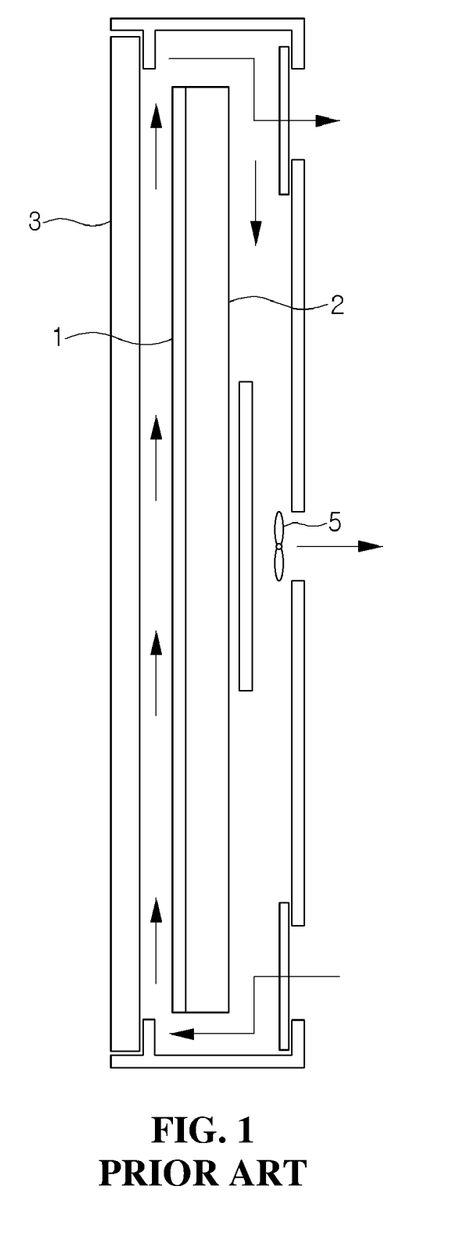
FIGS. 1 and 2 are views illustrating configurations of liquid crystal display devices according to the related art.
Figure 2:
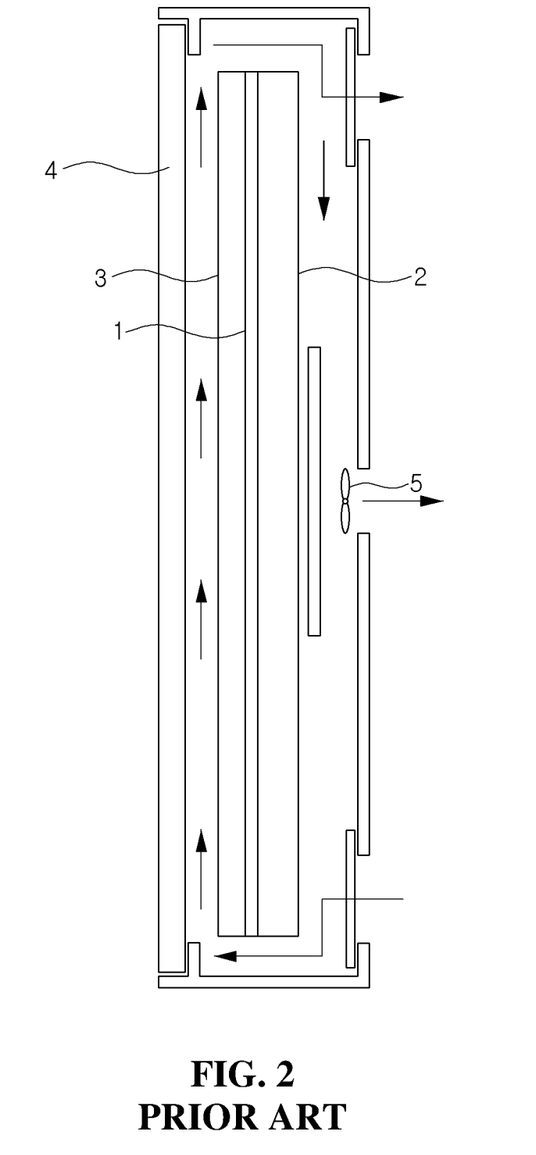

FIGS. 1 and 2 are views illustrating configurations of liquid crystal display devices according to the related art.

In the liquid crystal display device according to the related art, as shown in FIG. 1, a backlight unit 2 may be installed on a rear surface of a liquid crystal display panel 1, and the liquid crystal display panel 1 and a glass 3 may be spaced apart from each other by a predetermined interval.

When the liquid crystal display device according to the related art configured as described above is used in an environment exposed to direct sunlight or other high-temperature heat sources for a predetermined time, the liquid crystal display panel 1 may be cooled by moving air through a space between the glass 3 and the liquid crystal display panel 1.

However, as shown in FIG. 1, when the liquid crystal display panel 1 and the glass 3 are spaced apart from each other, due to causes such as double image formation on the glass 3 and the liquid crystal display panel 1 because of a separation interval, there has been a problem that image quality may be deteriorated.

In order to solve such a problem, as shown in FIG. 2, a technique in which the glass 3 is attached to the liquid crystal display panel 1 by a direct bonding scheme, and an additional glass 4 is installed on a front side of the glass 3 directly attached to the liquid crystal display panel 1 while being spaced apart from the glass 3 by a predetermined interval has been proposed.

However, since the liquid crystal display device shown in FIG. 2 requires two glasses 3 and 4, there has been a problem that a manufacturing cost may be increased, and workability may be reduced.

In particular, since the liquid crystal display device shown in FIG. 2 has a structure that air circulated by the driving of a blower fan 5 installed in a cover bottom is transferred to the glass 3 and the backlight unit 2, which are installed on front and rear surfaces of the liquid crystal display panel 1, respectively, and indirectly cools the liquid crystal display panel 1, there has been a problem that cooling efficiency may be reduced.

Therefore, in order to solve problems as described above, according to the present invention, in a state in which the liquid crystal display panel is attached to the glass by a direct bonding scheme, a separation space may be formed between the liquid crystal display panel and the backlight unit, and air may move through the separation space, so that the liquid crystal display panel may be directly cooled.

First Embodiment

Next, a configuration of the liquid crystal display device according to a first embodiment of the present invention will be described in detail with reference to FIG. 3.

Figure 3:
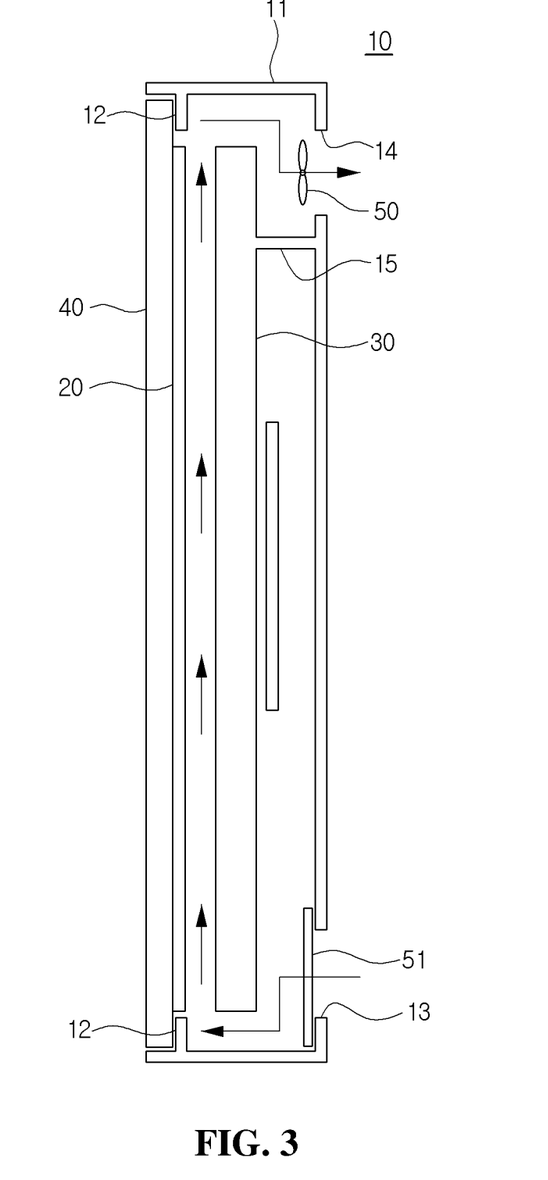
FIG. 3 is a view showing a configuration of a liquid crystal display device according to a first embodiment of the present invention.
Figure 4:
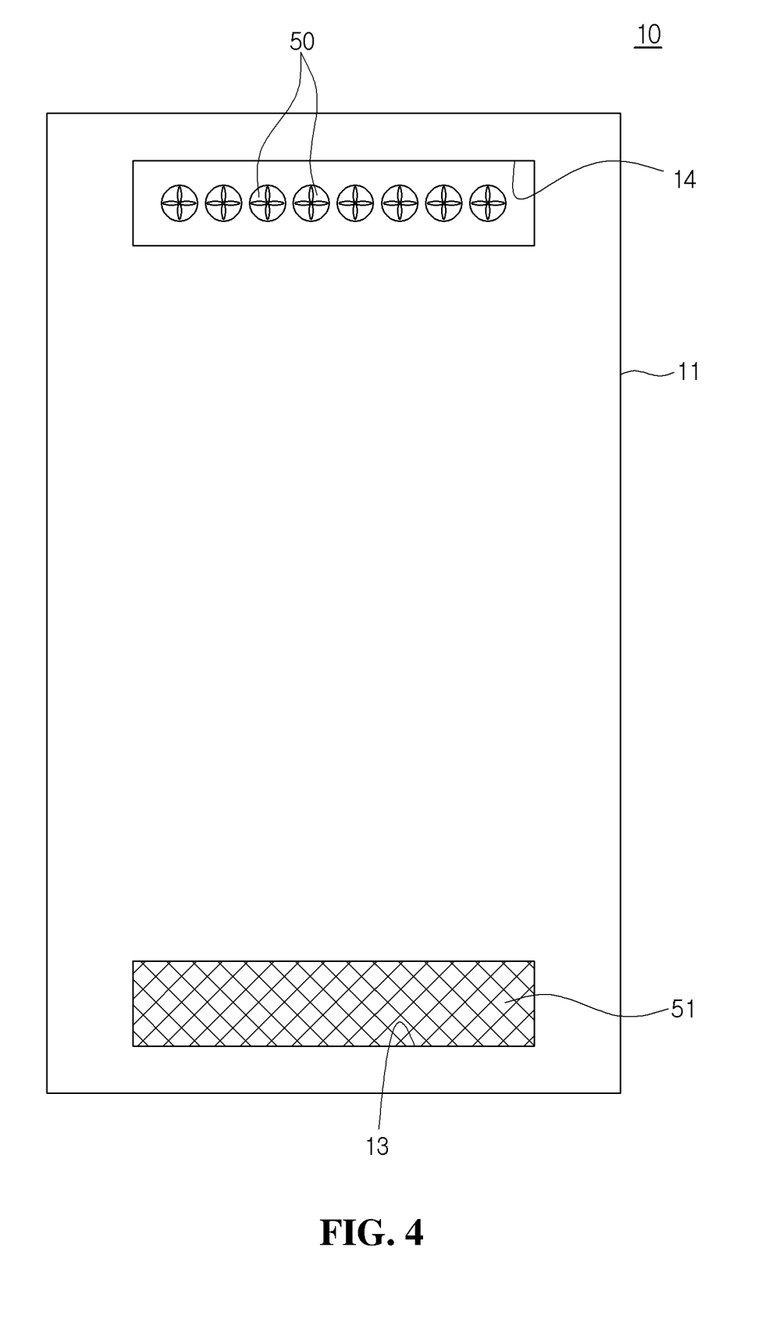
FIG. 4 is a rear view showing the liquid crystal display device shown in FIG. 3.

FIG. 3 is a view showing a configuration of a liquid crystal display device according to a first embodiment of the present invention, and FIG. 4 is a rear view showing the liquid crystal display device shown in FIG. 3.

According to the first embodiment of the present invention, as shown in FIG. 3, a liquid crystal display device 10 may include: a liquid crystal display panel 20 (hereinafter referred to as "panel") for displaying an image; a backlight unit 30 for irradiating light toward a rear surface of the panel 20; a cover bottom 11 formed therein with a space in which the panel 20 and the backlight unit 30 are installed; and a glass 40 attached to a front surface of the panel 20 by a direct bonding scheme to protect the panel 20.

A structure in which a cover bottom and a case top manufactured by using a metal material are coupled to each other is applied to a liquid crystal display device according to the related art.

Recently, in order to improve an immersion level and differentiate a design by minimizing a bezel of the liquid crystal display device 10, the case top formed of a metal material has been removed, and a glass 40 manufactured by using a glass material has been applied to a front surface of the liquid crystal display device 10.

To this end, the cover bottom 11 may have a substantially hexahedral shape with an open front surface, and the glass 40 may be installed on a front surface of the cover bottom 11.

A panel guide having a rectangular frame shape on which the panel 20 is seated may be installed on an inner surface of an edge of the cover bottom 11.

However, in the present embodiment, the cover bottom 11 and the panel guide are not separated, and are collectively referred to as the cover bottom 11.

A support part 12 having a front surface on which the glass 40 is seated and configured to support the panel 20 that is coupled to an inner surface of the glass 40 may be formed on the inner surface of the edge of the cover bottom. In other words, the support part 12 may perform a function of the panel guide.

The glass 40 may have a sectional area greater than a sectional area of the panel 20, and may be disposed on a front side of a space formed inside the cover bottom 11.

The panel 20 may be attached to the glass 40 by the direct bonding scheme, and may have a sectional area corresponding to a space formed inside the support part 12.

Therefore, the glass 40 may be supported by the cover bottom 11, and the panel 20 may be stably supported by the support 12 of the cover bottom 11.

The backlight unit 30 may be installed on a rear side of the panel 20 while being spaced apart from the panel 20 by a preset interval.

In other words, the panel 20 and the backlight unit 30 may be spaced apart from each other by the preset interval, and a movement space through which air moves by a fan 50 that will be described below may be formed between the panel 20 and the backlight unit 30.

The preset interval may be set based on a test result obtained by measuring surface temperatures of the glass 40 and the panel 20 under a sunlight condition.

For example, in the present embodiment, the preset interval may be set to about 10.0 mm±2.0 mm.

However, the present invention is not necessarily limited to the above configuration, and the preset interval may vary according to various conditions such as a standard of each component applied to the liquid crystal display device.

Meanwhile, the cover bottom 11 may be formed at a lower end thereof with an inlet hole 13 through which external air is introduced through the cover bottom 11, and the cover bottom 11 may be formed at an upper end thereof with an outlet hole 14 through which air that is heated through heat exchange with the panel 20 in a process of moving through the movement space is discharged to an outside.

An air filter 51 for filtering dust or foreign substances included in the external air may be installed in the inlet hole 13, and a fan 50 for sucking the air inside the cover bottom 11 to discharge the sucked air to the outside may be installed in the outlet hole 14.

In addition, a blocking plate 15 for preventing the air introduced through the inlet hole 13 from directly moving to the outlet hole 14 along a rear space of the backlight unit 30 may be formed at a rear wall of the cover bottom 11.

The blocking plate 15 may have a width corresponding to a distance between the cover bottom 11 and the backlight unit 30 to perform a function of supporting the backlight unit 30.

As described above, according to the present invention, the liquid crystal display panel is attached to the glass by the direct bonding scheme, and the backlight unit is installed on the rear side of the liquid crystal display panel while being spaced apart from the liquid crystal display panel by a preset interval to allow the air to move through the separation space, so that the liquid crystal display panel can be directly cooled.

Therefore, when the present invention is used in an environment exposed to direct sunlight or other high-temperature heat sources for a predetermined time, thermal deformation of the liquid crystal display panel due to high-temperature radiant heat generated from the glass can be prevented.

Accordingly, according to the present invention, damage due to the thermal deformation of the liquid crystal display panel can be effectively prevented.

In addition, according to the present invention, the liquid crystal display panel is directly attached to the glass through the direct bonding scheme, so that image quality of a screen can be maximized.

Next, a coupling relation and an operating method of the liquid crystal display device according to the first embodiment of the present invention will be described in detail.

First, a worker may install the backlight unit 30 while a rear surface of the cover bottom 11 is seated on a worktable.

In this case, the air filter 51 and the fan 50 may be installed in the inlet hole 13 and the outlet hole 14 that are formed at the lower and upper ends of the cover bottom 11, respectively.

Subsequently, the glass 40 may be attached to the front surface of the panel 20 by the direct bonding scheme.

The glass 40 and the panel 20 attached to each other as described above may be coupled to an inside of the cover bottom 11.

Then, the panel 20 may be coupled to an inner space of the support part 12 formed in a rectangular frame shape on the inner surface of the edge of the cover bottom 11 so as to be supported by the support part 12, and the glass 40 may be seated on a front surface of the support part 12.

When the liquid crystal display device 10 assembled through a process described above is used in the environment exposed to direct sunlight or other high-temperature heat sources for a predetermined time, the fan 50 may be driven to directly cool the panel 20.

In other words, a main controller (not shown) for controlling driving of each device provided in the liquid crystal display device 10 may generate a control signal for controlling the driving of the fan 50 based on a temperature detected by a temperature sensor (not shown) for detecting a temperature inside the liquid crystal display device 10 or a temperature of the panel 20.

When the fan 50 is driven by the control signal of the main controller, the external air from which the dust or the foreign substances have been filtered in a process of passing through the air filter 51 installed at the lower end of the cover bottom 11 may be introduced into the cover bottom 11.

Since the blocking plate 15 is installed between the rear wall of the cover bottom 11 and the backlight unit 30, the introduced air may move upward along the movement space between the panel 20 and the backlight unit 30 without being directly discharged through the outlet hole. At this time, the panel 20 and the glass 40 may be cooled through the heat exchange with the panel 20.

The air heated while cooling the panel 20 as described above may move upward so as to be discharged to the outside through the outlet hole 14 formed at the upper end of the cover bottom 11.

Figure 6:
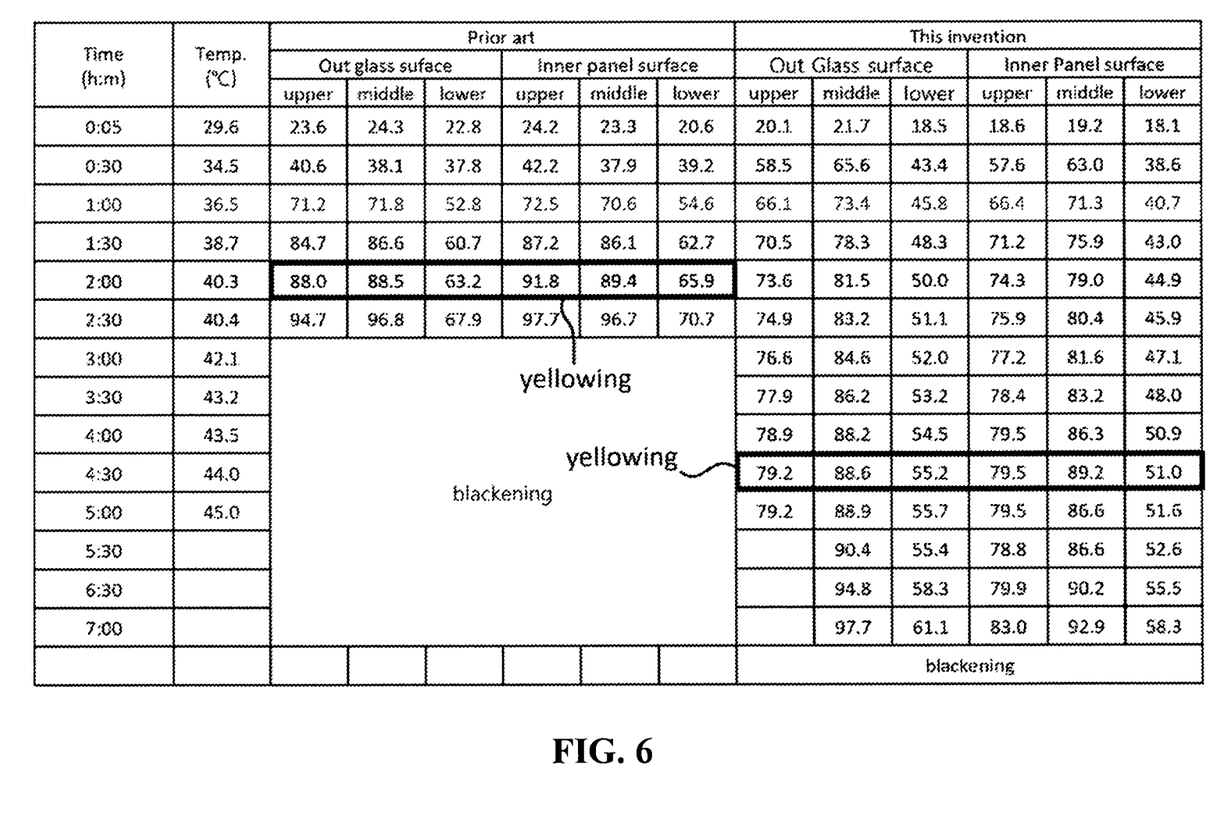
FIG. 6 shows the results of measuring the glass surface temperature until an abnormal phenomenon of the panel occurs by applying conditions similar to the direct sunlight.

FIG. 6 is a table of test results obtained by measuring a glass surface temperature and a panel surface temperature of the liquid crystal display devices according to the related art and the present invention according to external temperature conditions.

FIG. 6 shows the results of measuring the glass surface temperature until an abnormal phenomenon of the panel occurs by applying conditions similar to the direct sunlight.

In other words, FIG. 6 shows the result of measuring an external surface temperature of the glass 40 and an internal surface temperature of the panel 20 of the liquid crystal display device 10 according to the present invention compared to the liquid crystal display device according to the related art shown in FIG. 1 under the same conditions when 5 minutes have elapsed from the start of a test and in a unit of 30 minutes from the start of the test.

In addition, FIG. 6 shows a temperature and a time at which yellow deformation (hereinafter referred to as "yellowing") due to gravity acting on the glass 40 and the panel 20 starts to occur.

The test was performed under the same conditions until a time at which a blackening phenomenon due to deformation of liquid crystals of the panel 20 occurs.

As a result of performing the test under the above conditions, it was found that the liquid crystal display device 10 according to the present invention may extend a yellowing occurrence time from about 2 hours to about 4 hours and 30 minutes that is twice or more as compared with the liquid crystal display device according to the related art, and may also extend an occurrence time of the blackening phenomenon that causes the deformation of the liquid crystals of the panel 20 from about 3 hours to about 7 hours or more as compared with the liquid crystal display device according to the related art.

In this case, unless yellowing due to gravity is continuously accumulated to cause the blackening phenomenon, a yellowing phenomenon may disappear when heat applied from the outside is removed.

In general, a liquid crystal display device installed outdoors may not be directly exposed to the direct sunlight for 4 hours or more.

Therefore, the above test conditions are extreme conditions, and the test was performed under severe conditions than actual sunlight conditions. When the liquid crystal display device according to the related art is used for 4 hours or more under a direct sunlight condition while being installed outdoors, the yellowing occurred in about 20% to 30%.

Therefore, it may be determined by merging the above test results and actual conditions of use that the liquid crystal display device 10 according to the present invention has a heat dissipation effect of twice or more as compared with the liquid crystal display device according to the related art.

Through a process as described above, according to the present invention, in the state in which the liquid crystal display panel is attached to the glass by the direct bonding scheme, the separation space may be formed between the liquid crystal display panel and the backlight unit, and the air may move through the separation space, so that the liquid crystal display panel may be directly cooled.

Meanwhile, although the present embodiment has been described that the inlet hole 13 and the outlet hole 14 are formed at the lower and upper ends of the cover bottom 11, respectively, and the air filter 51 and the fan 50 are installed in the inlet hole 13 and the outlet hole 14, respectively, the present invention is not necessarily limited thereto.

In other words, the present invention may be modified such that the air filter 51 and the fan 50 are installed in the inlet hole 13 to suck the external air and supply the sucked air to the panel 20, and the air heated through the heat exchange is discharged through the outlet hole 14.

In addition, the present invention may be modified such that a plurality of outlet holes 14 are formed at the upper end and a center portion of the cover bottom 11, the air filter 51 is installed in both the inlet hole 13 and the outlet hole 14, and the fan 50 is installed in at least one of the inlet hole 13 and the outlet hole 14.

In addition, although eight fans are shown in FIG. 4, a number, a capacity, and the like of installed fans 50 may vary according to various conditions such as a size, a shape, and the like of a position where the fan 50 is installed, that is, the outlet hole 14 or the inlet hole 13.

Meanwhile, although the first embodiment has been described that the liquid crystal display panel is cooled by introducing the external air of the liquid crystal display device, when a high-temperature environment is formed around the liquid crystal display device, the external air flowing into the liquid crystal display panel has a high temperature, so that a cooling effect of the liquid crystal display panel may be reduced.

In order to solve the above problem, the present invention may be modified to cool the liquid crystal display panel by inducing thermal equilibrium by circulating air inside the liquid crystal display device.

Second Embodiment

Figure 5:
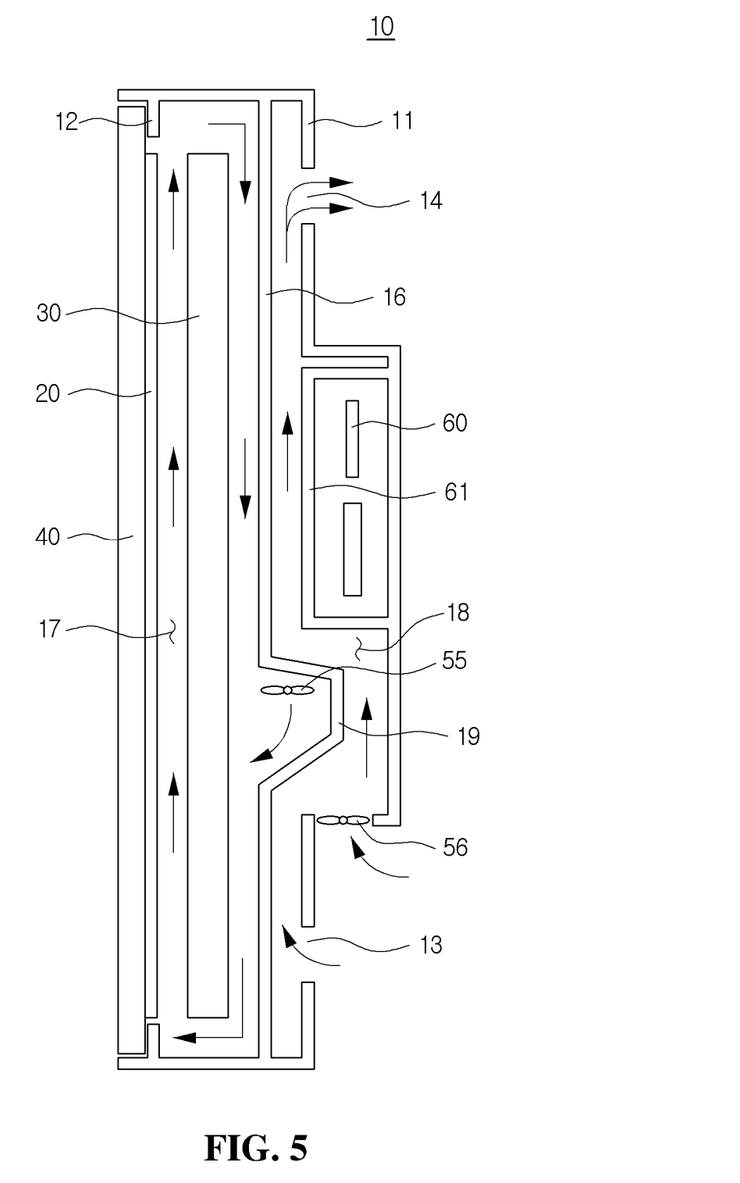
FIG. 5 is a view showing a liquid crystal display device according to a second embodiment of the present invention.

FIG. 5 is a view showing a liquid crystal display device according to a second embodiment of the present invention.

As shown in FIG. 5, a liquid crystal display device 10 according to a second embodiment of the present invention has a configuration that is similar to the configuration of the liquid crystal display device 10 described in the first embodiment with reference to FIGS. 3 and 4 except that an inner space of the liquid crystal display device 10 is sealed, and air is circulated inside the sealed space to induce thermal equilibrium, so that the liquid crystal display panel 20 is cooled.

Therefore, redundant descriptions of components that are identical to the components of the above-described embodiment will be omitted.

In detail, the cover bottom 11 may include a rear cover 16 configured to separate a space in which the glass 40, the liquid crystal display panel 20, and the backlight unit 30 are installed from a space in which a circuit component that generates heat during driving is installed.

The rear cover 16 may be arranged in a vertical direction between the backlight unit 30 and an installation cover 61 in which a circuit component 60 is installed.

Therefore, a sealed space may be formed on a front side of the rear cover 16 between the liquid crystal display panel 20 attached to the glass 40 and the rear cover 16.

A circulation passage 17 through which the air inside the sealed space circulates may be formed in the sealed space on front, rear, upper, and lower sides of the backlight unit 30.

In addition, a cooling passage 18 configured to perform cooling by introducing the external air through the inlet hole 13 and the outlet hole 14, which are formed at lower and upper ends of the rear surface of the cover bottom 11, respectively, may be formed on a rear side of the mar cover 16.

The circulation passage 17 may circulate the air by moving the air on the rear side of the backlight unit 30 downward, and moving the air on the front side of the backlight unit 30 upward within the sealed space.

In this case, the rear cover 16 may be formed of a metal material having excellent thermal conductivity, such as aluminum, to cool the sealed space by transferring heat generated in the sealed space toward the cooling passage 18.

In addition, an internal fan 55 configured to circulate the air inside the sealed space may be installed in the circulation flow pat 17.

The internal fan 55 may supply lower air, which is located on the rear side of the backlight unit 30 and has a lower temperature than upper air in the sealed space, between the liquid crystal display panel 20 and the backlight unit 30 to move the lower air upward.

Therefore, the air supplied between the liquid crystal display panel 20 and the backlight unit 30 may move upward to perform the heat exchange with the liquid crystal display panel 20 and the backlight unit 30.

As described above, according to the present invention, the sealed space may be formed inside the liquid crystal display device, and the air inside the sealed space may be circulated, so that the thermal equilibrium may be induced inside the sealed space.

Therefore, according to the present invention, when compared with a scheme of directly introducing external air into a liquid crystal display device by using a fan and an air filter as in the first embodiment, the same cooling effect may be obtained with a simple structure.

In other words, the scheme of directly introducing the external air may be effective when the external air has a lower temperature than internal air, whereas it may be difficult to expect a great effect under conditions in which the external air has a higher temperature than the internal air, for example, in an environment where the temperature of the external air is 40° C. or higher or in an environment exposed to direct sunlight or other high-temperature heat sources in summer.

In addition, the scheme of directly introducing the external air may be disadvantageous to dust proofing or waterproofing, and may periodically require replacement and cleaning of a filter.

Therefore, according to the present invention, a completely sealed structure in which the liquid crystal display panel and the backlight unit are arranged inside the liquid crystal display device may be provided, so that a disadvantage that the replacement and cleaning of the filter have to be performed may be sufficiently compensated for, and the present invention may be applied to a product even when a use environment is under unfavorable conditions, such as a high-temperature environment and a state where much dust or foreign substances exist.

In addition, according to the present invention, the thermal equilibrium may be induced by the circulation of the air inside the sealed space, so that the rear cover may be directly cooled by introducing the external air to an outside of the rear cover spaced apart from the backlight unit by using an external fan or the like, and thus an indirect heat dissipation effect may also be obtained.

In other words, an external fan 56 configured to introduce the external air through the inlet hole 13 to move the introduced air upward to the outlet hole 14 may be installed in the cooling passage 18 formed on the rear side of the rear cover 16 in an inner space of the cover bottom 11.

Therefore, the external air introduced through the inlet hole 13 may cool the rear cover 16 through the heat exchange with the rear cover 16 while moving upward along the cooling passage 18, and may be discharged to the outside through the discharge hole 14.

Meanwhile, a protrusion 19 protruding rearward to increase a contact area with the cooling passage 18 may be provided on the rear cover 16.

The protrusion 19 may protrude rearward toward the cooling passage 18 from a portion of the rear cover 16 lower than a central portion of the rear cover 16.

In this case, the internal fan 55 may be installed on the protrusion 19 to increase the cooling effect.

In other words, the protrusion 19 may cool the air inside the circulation passage 17 by increasing the contact area with the cooling passage 18, the internal fan 55 may be installed in a space formed by the protrusion 19, and the air cooled through the heat exchange with the rear cover 16 may be supplied between the liquid crystal display panel 20 and the backlight unit 30 through a lower portion of the backlight unit 20.

As described above, according to the present invention, the protrusion protruding rearward from the rear cover may be provided, and the internal fan may be installed in the protrusion, so that cooling performance of the air circulating along the circulation passage may be improved.

Although the present invention invented by the present inventor has been described in detail with reference to the embodiments, the present invention is not limited to the above embodiments, and various modifications are possible without departing from the gist of the present invention.

The present invention may be applied to a liquid crystal display device technique in which, in a state where a liquid crystal display panel is attached to a glass by a direct bonding scheme, a sealed space is formed between the liquid crystal display panel and a backlight unit, and air is circulated inside the sealed space to induce thermal equilibrium, so that the liquid crystal display panel may be cooled.

What is claimed is:
1. A liquid crystal display device comprising:
a liquid crystal display panel for displaying an image;
a backlight unit for irradiating light toward a rear surface of the liquid crystal display panel;
a cover bottom formed therein with a space in which the liquid crystal display panel and the backlight unit are installed; and
a glass directly attached to a front surface of the liquid crystal display panel to protect the liquid crystal display panel,
wherein the liquid crystal display panel and the backlight unit are spaced apart from each other so that air moves in a vertical direction through a upward passage between the liquid crystal display panel and the backlight unit,
wherein the cover bottom includes a rear cover configured to separate the space into a first space and a second space, in the first space, the glass, the liquid crystal display panel, and the backlight unit are installed, in the second space, a circuit component that generates heat during driving is installed,
the first space is surrounded by the cover bottom, the liquid crystal display panel and the rear cover,
the second space is surrounded by the cover bottom and the rear cover, the first space is a sealed space which forms a circulation passage surrounding the backlight unit, the circulation passage is configured to cool the liquid crystal display panel by circulating air inside the sealed space around the backlight unit, the circulation passage includes the upward passage and a downward passage, and the circulation passage circulates the air by moving the air downward though the downward passage between the backlight unit and the rear cover, and by moving the air upward though the upward passage between the backlight unit and the liquid crystal display panel.

2. The liquid crystal display device of claim 1, wherein a cooling passage configured to cool the rear cover by moving external air introduced through an inlet hole and discharge heat-exchanged air to an outside is formed on a rear side of the rear cover.

3. The liquid crystal display device of claim 2, wherein an internal fan configured to circulate the air inside the sealed space is installed in the circulation passage, and an external fan configured to introduce the external air of the liquid crystal display device into the liquid crystal display device and move the introduced air is installed in the cooling passage.

4. The liquid crystal display device of claim 3, wherein a protrusion protruding toward the cooling passage to increase a contact area with the cooling passage is provided on the rear cover, and the internal fan is installed on the protrusion to circulate the air into the upward passage between the liquid crystal display panel and the backlight unit.

\* \* \* \* \*